(12) United States Patent
Graybill et al.

(10) Patent No.: US 10,181,108 B1
(45) Date of Patent: Jan. 15, 2019

(54) ITEM ATTRIBUTE COLLECTION

(71) Applicant: AMAZON TECHNOLOGIES, INC., Reno, NV (US)

(72) Inventors: Jules Cook Graybill, Seattle, WA (US); James Christopher Curlander, Mercer Island, WA (US); Danny Guan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 943 days.

(21) Appl. No.: 14/228,067

(22) Filed: Mar. 27, 2014

(51) Int. Cl.
*B07C 7/02* (2006.01)
*G01B 11/00* (2006.01)
*G06Q 10/06* (2012.01)
*G06Q 10/08* (2012.01)

(52) U.S. Cl.
CPC ....... *G06Q 10/0639* (2013.01); *G06Q 10/087* (2013.01)

(58) Field of Classification Search
CPC .................................................. B07C 7/005
See application file for complete search history.

(56) References Cited

U.S. PATENT DOCUMENTS

| | | | | |
|---|---|---|---|---|
| 5,331,118 A * | 7/1994 | Jensen | ................... | G01B 11/00 177/245 |
| 5,555,090 A * | 9/1996 | Schmutz | ............ | G01B 11/0608 356/601 |
| 6,737,600 B2 * | 5/2004 | Takizawa | ................ | B07C 7/005 209/583 |
| 7,984,809 B1 * | 7/2011 | Ramey | ...................... | B07C 7/02 198/347.1 |
| 2003/0116481 A1 * | 6/2003 | Takizawa | ................ | B07C 7/005 209/583 |
| 2005/0205387 A1 * | 9/2005 | Malatesta | ............ | B65G 11/163 193/8 |
| 2007/0135964 A1 * | 6/2007 | Bonham | .......... | G05B 19/41845 700/230 |

* cited by examiner

*Primary Examiner* — Talia F Crawley
(74) *Attorney, Agent, or Firm* — Lowenstein Sandler LLP

(57) ABSTRACT

Systems and methods for receiving objects into inventory are described. The objects are individually scanned to generate scan data. The scan data is processed to determine what the object is (and to add the object into inventory) and also to determine values for one or more additional attributes. The attribute values are stored in a data structure which may be analyzed to detect a change over time.

17 Claims, 6 Drawing Sheets

US 10,181,108 B1

ITEM ATTRIBUTE COLLECTION

BACKGROUND

In a warehouse or other location from which ordered goods are shipped to an ordering party, such as a fulfillment center, items of stock progress through a number of stages after being ordered from a vendor and before being shipped to a customer. For example, an inbound process for items of stock may include delivery of the items of stock at a warehouse, a sort process in which the items of stock are sorted by a first worker into a number of categories, a receive process in which the items of stock are entered into inventory by a second worker individually scanning each item with a portable electronic device and a stow process in which the items of stock are placed by a third worker in an appropriate storage location until being ordered by a customer. An outbound process may similarly include a number of processes. Each of these processes takes time and effort.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

Figure 1:
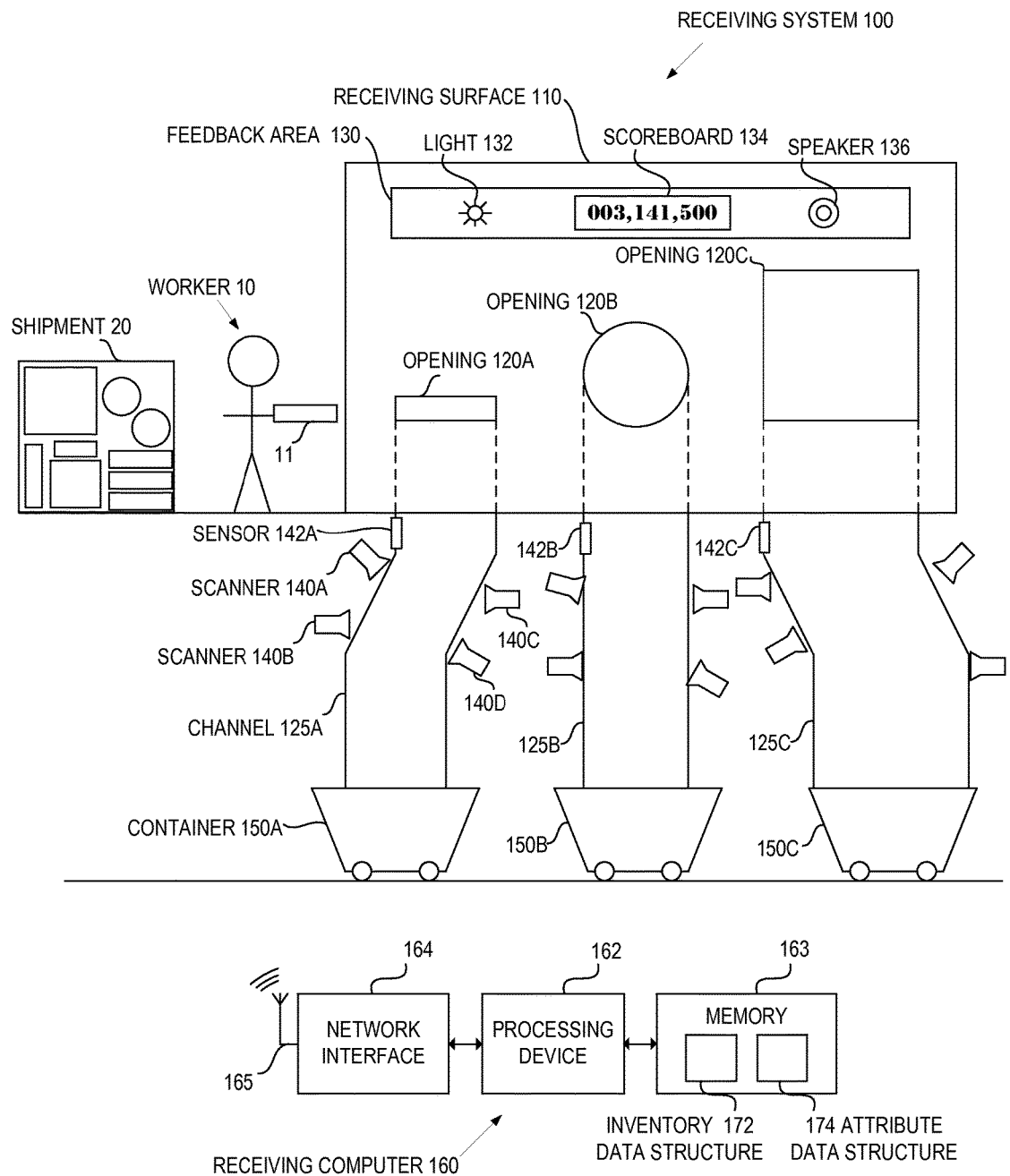
FIG. 1 illustrates an embodiment of receiving system.

As noted above, in a materials handling facility, a warehouse, fulfillment center, or another location from which ordered goods are shipped to the ordering party, items of stock progress through a number of stages after being ordered from a vendor and before being shipped to a customer. For example, an inbound process for items of stock may include delivery of the items of stock at a warehouse, a sort process in which the items of stock are sorted into a number of categories, a receive process in which the items of stock are entered into inventory and a stow process in which the items of stock are placed in an appropriate storage location until being ordered by a customer.

Described herein is a system that speeds up the inbound process by partially merging and automating the sort process and receive process. The system includes a receiving wall with a number of openings of various sizes into which workers insert items of stock according to their size. Each opening is coupled by a chute to a bin to receive the sorted items of stock (items). Along each chute, a number of imaging devices (e.g., cameras) image each item, thereby generating scan data. The scan data may be processed to determine what the item is and/or to receive the item into inventory. For example, the scan data may represent a barcode of the item and, in response, an entry for the item may be added into an inventory database based on the barcode.

The scan data may also be processed to determine other information about the item. For example, the scan data may be used to determine a size of the item and determine whether, based on that size, the item was deposited in the correct slot, e.g., the slot associated with that size. An indication of whether or not the item was deposited in the correct slot may be fed back to the worker in a detectable form (e.g., a light, a buzzer, or other notification element/device). In general, a performance metric can be determined indicative of an accuracy and/or a speed of the worker's deposition and the performance metric can be communicated to the worker in the form of a score or other feedback. This feedback may be used to gamify the process or otherwise incentivize the worker to perform efficiently.

The scan data may be used to determine other attributes of the item, such as a shape of the item or a packaging parameter (such as an image of the packaging, a predominant color of the packaging, or text present on the packaging). Such attributes may be determined based on one or more 2D and/or 3D image object detection and/or object recognition techniques. For example, techniques such as edge detection, edge matching, greyscale matching, gradient matching, interpretation trees, pose consistency, pose clustering, invariance, geometric hashing, bag-of-words approaches, and so forth may be used. Additionally, character recognition techniques may be used to determine text.

Values indicative of the attribute may be stored and/or compared with previously stored values to determine whether the attribute has changed. For example, the scan data may be used to determine a dominant color of the cover of a particular book. In one embodiment, an image of the book may be included in the scan data, a portion of the image comprising a set of pixels may be determined as being of the cover of the book, and an average color of those pixels may be determined as the dominant color of the cover. Scan data for many copies of the book may indicate that the dominant color of the cover over a first time period is blue. If later scan data for copies of the book over a second time period indicates that the dominant color of the cover is red, this may indicate that a new edition has been published with new cover art. This indication may be communicated to a user who may update an image database or perform other actions.

Although embodiments described below refer generally to a receiving system of a warehouse used to sort and receive incoming items of stock, it is to be appreciated that other aspects described herein may be used in other environments, to sort and/or receive other objects or for other purposes. For example, aspects described herein may be used to sort and/or receive incoming stock in a retail store or to sort and/or receive raw materials at a manufacturing plant or other facility.

FIG. 1 illustrates an embodiment of a receiving system 100. The receiving system 100 includes a receiving surface 110 having a number of openings 120A-120C into which a worker 10 deposits objects 11 from a shipment 20 of objects. In one embodiment, the openings 120A-120C are of different sizes and the worker 10 is to deposit objects 11 into the different-sized openings 120A-120C according to the size of the object 11. For example, the openings 120A-120C may include a small opening for receiving small objects and a large opening for receiving large objects. In addition to or instead of the openings 120A-120C being of different sizes, the openings 120A-120C may be of different shapes. The worker 10 may deposit objects into the different-shaped openings 120A-120C according to a shape of the object and/or the size of the object. For example, the openings 120A-120C may include a substantially flat shape for receiving substantially flat objects (e.g., books) and a more proportional shape for receiving other objects. In another embodiment, each of the openings 120A-120C is identical and the worker 10 is to deposit objects 11 into the openings 120A-120C based on another parameter, such as color, cost, fragility, rigidity or any other parameter.

Each of the openings 120A-120C is coupled by a respective channel 125A-125C to a respective container 150A-150C for storing the sorted objects. Although FIG. 1 illustrates the channels 125A-125C as mostly vertical chutes, it is to be appreciated that the channels 125A-125C may take any of a number of forms. The channels 125A-125C may be slanted, horizontal or J-shaped. The channels 125A-125C may be enclosed tubes or open troughs. The channels 125A-125C may be passive such that the objects 11 progress along the channels 125A-125C due to gravity or the channels 125A-125C may be active such that the objects 11 are moved along the channels 125A-125C by a motor or conveyer system. Similarly, although FIG. 1 illustrates the containers 150A-150C as carts, the containers 150A-150C can take any form for containing the objects 11.

Associated with each channel 125A-125C is a respective proximity sensor 142A-142C to detect the presence of an object 11 within the channel and a number of scanners 140A-140D to scan the object 11 within the channel. As used herein, "within a channel" includes objects enclosed by walls of a channel, but also includes objects along the path broadly defined by the channel. Thus, if the channel is a horizontal conveyer belt, an object positioned on the conveyer belt would be considered "within the channel." Similarly, a camera positioned above the conveyer belt to image objects on the belt would also be considered "within the channel." Likewise, the scanners 140A-140D and sensor 142A illustrated in FIG. 1 are considered within the channel 125A.

The proximity sensors 142A-142C may include any type of device or configuration to detect the presence of an object with or without physical contact of the object. For example, the proximity sensors 142A-142C may emit an infrared signal and detect a return signal to determine that an object is present. The proximity sensors 142A-142C may include capacitive or inductive proximity sensors. The proximity sensors 142A-142C may include a lever or switch which is depressed by an object passing within the channel. The proximity sensor 142A-142C may include other types of sensors.

The scanners 140A-140D may include any type of device for scanning the object 11 or otherwise generating scan data concerning the object 11. The scanners 140A-140D may include one or more image capture devices (such as a camera or video recorder) for imaging the object 11. For example, the scanners 140A-140D may include two image capture devices disposed on opposite sides of the channel 125A so as to image two opposite sides of the object 11 at once. As a further example, the scanners 140A-140D may include three or more image capture devices disposed in various positions within the channel 125A so as to surround the object 11 and image all sides of the object 11 at once. A light, e.g. a flash or strobe, may be disposed within the channel 125A so as to briefly illuminate the object during the imaging so as to reduce blur and improve image quality. The scanners 140A-140D may include a barcode scanner, including a one-dimensional or a two-dimensional barcode scanner. An image capture device and a barcode scanner may each generate visual data concerning the object 11 and may each include, among other things, one or more of a light source, a lens or a light sensor.

The scanners 140A-140D may include an RFID (radio frequency identification) reader or an NFC (near-field communication) reader. An RFID reader and an NFC reader may generate data concerning the object based on information encoded on a chip of the object 11. The scanners 140A-140D may include a scale to measure a weight of the object 11. The scanners 140A-140D may include a microphone to record a sound the object 11 makes as it progresses along the channel 125A. The scanners 140A-140D may include other types of sensors, scanners or data generating devices. Although described separately, it is to be appreciated that the term "scanner" may include the sensors 142A-142C.

The receiving system 100 may include a receiving computer 160. The receiving computer 160 may include a processing device 162 to, among other functions, process the data generated by the scanners 140A-140D and the sensors 142A-142C to receive objects into inventory. The receiving computer 160 may include a memory 163 in digital communication with the processing device 162. The memory 163 may store, among other things, an inventory data structure 172 and an attribute data structure 174. Each data structure may include one or more files, tables, arrays, sets, objects, graphs, trees, spreadsheets, or databases.

The inventory data structure 172 stores inventory information concerning objects in inventory. In one embodiment, the inventory data structure 172 may store a record for each object 11 in inventory. In another embodiment, the inventory data structure 172 may store a record for each of a multitude of object types, the record indicating a number of objects of that object type in inventory. The inventory data structure 172 may store inventory information in other ways.

The attribute data structure 174 stores object attribute information concerning attributes of scanned objects. The attribute data structure 174 may store a record for each of a multitude of object types, the record including multiple entries of values of an attribute derived from data for multiple objects of the object type. In particular, the attribute data structure 174 may include a first record that associates a first object type with a first set of values of an attribute and may also include a second record associating a second object type with a second set of values of the attribute.

A record of the attribute data structure 174 may store information regarding more than one attribute for each object type. In particular, the attribute data structure 174 may include a record associated with an object type that includes a first page with a number of entries of values of a first attribute and also includes a second page with a number of entries of values of a second attribute. Although the methods described below are primarily discussed with respect to a single attribute, it is to be appreciated that they may be performed for multiple attributes for the same objects at the same time.

As a particular example, the attribute data structure 174 may include a record for a book entitled "Edgar Allan Poe: Complete Tales and Poems" having the ISBN (international standard book number) 978-0785814535. The record may store a set of values of an attribute derived from data concerning multiple copies of the book. For example, the record may store a predominant cover color (e.g., as a set of RGB [red, green, blue] values) for each copy of the book. As another example, the record may store a set of values indicative of measured dimensions for each copy of the book. The attribute data structure 174 may include records for other books or other items. The attribute data structure 174 may include other attributes.

The receiving computer 160 may include a network interface 164 by which the processing device 162 receives information from the scanners 140A-140C and sensors 142A-142C or other sources and, as described further below, sends information to devices of a feedback area 130 or other devices. The scanners 140A-140D may communicate with the receiving computer 160 wirelessly via one or more antennas 165 or via a wired connection.

The processing device 162 may process the data generated by the scanners 140A-140D and the detection information received from the sensors 142A-142C (the data generated by the scanners 140A-140D and the sensors 142A-142C collectively being referred to as "scan data"). The processing device 162 may process the scan data to identify the object. In one embodiment, a barcode reading or an RFID reading included in the scan data may be compared to a data structure associating such readings with object type identifiers. Thus, the processing device 162 may, based on the scan data for the object, generate type data indicative of an object type of the object, e.g., data indicative of the object's identity. The type data may indicate the object type in any of number of ways. For example, the type data may be number, such as an ISBN number or a UPC (Universal Product Code). As another example, the type data may be a string, such as a book title or an item name. The type data may be other forms of data.

The processing device 162 may generate the type data based on a barcode reading provided in the scan data, such as, for example, if the scanners 140A-140D include a barcode scanner. The processing device 162 may additionally or alternatively generate the type data based on image analysis of an image provided in the scan data. The image analysis may identify a barcode (including a one-dimensional barcode or a two-dimensional barcode, such as a QR [quick response] code) or other data usable to identify the type data. The processing device 162 may also generate the type data based on other analysis of the scan data.

The processing device 162 may add the object 11 into inventory based on the type data. For example, the processing device 162 may add an entry to the inventory data structure 172 indicating that an object of the object type has been received. The processing device 162 may add an entry by creating a new record for the object or by modifying an existing record associated with the object type of the object 11 and incrementing a counter of the record to indicate that the number of objects of that object type in inventory has increased (e.g., increased by one).

The processing device 162 may process the scan data to determine the opening 120A-120C into which the worker 10 deposited the object 11. In one embodiment, the processing device 162 may determine which sensor 142A-142C detected the object, which channel 125A-125C that sensor is located in, and which opening 120A-120C is connected to that channel. In particular, the processing device 162 may process the scan data to determine the channel 125A-125C in which the object was detected (e.g., by the sensors 142A-142C). Thus, the processing device 162 may, based on the scan data for the object 11, generate sort data indicative of one of the channels 125A-125C in which the object 11 was detected. The sort data may indicate one of the channels 125A-125C in any of a number of ways. For example, the sort data may be number, such as '0', '1' or '2'. As another example, the sort data may be a string, such as "small", "medium" or "large". The sort data may be other forms of data.

The processing device 162 may process the scan data to determine a value of an attribute of the object 11, such as a size of the object 11. For example, the scan data may include an image of the object, a portion of the image comprising a set of pixels may be determined to be of the object, and the width of that portion, the height of that portion, or the area of that portion may be proportional to a size of the object. The size may also be determined by performing forms of image analysis of images generating by the scanners 140A-140D as described further below with respect to block 220 of FIG. 2 Thus, the processing device 162 may, based on the scan data for the object 11, generate attribute data indicative of a value of an attribute of the object 11. For example, the processing device 162 may, based on the scan data for the object 11, generate size data indicative of a size of the object 11.

The attribute may be any attribute derivable from the scan data. The attribute may be a size of the object 11, including dimensions (e.g., width, length or thickness) of the object 11 or a volume of the object 11. The attribute may be a color of the object 11, such as a predominant packaging color or a cover art color. The attribute may be more complex, such as a packaging image or a book cover art image. The attribute may be a shape of the object 11. The attribute may be a three-dimensional model of the object 11. The attribute may be text on the object 11. For example, the attribute may be the presence or absence of particular text on the object 11, e.g., "WARNING" or "DANGER". As another example, the value of the attribute may be a string of actual text identified on the object 11 by optical character recognition (OCR). The attribute data may be indicative of other attributes. Values for other types of attributes may also be determined.

The processing device 162 may store the determined value of the attribute in the attribute data structure 174 based on the type data, e.g., in a record of the attribute data structure 174 associated with the object type of the object 11 indicated by the type data. The attribute data structure can be used to determine whether an attribute of an object has changed over time or whether a particular batch of objects of an object type is similar to or different than other objects of the same object type. As a particular example, scan data for each object in a received shipment of shampoo bottles may be used to determine size data for each of the objects indicating an average volume of approximately 20 ounces, with a standard deviation of less than an ounce. The size may be determined, for example, by performing image analysis as described above or by performing character recognition of text on the bottle indicating the size. The attribute database may indicate that the average volume of previously received shampoo bottles is approximately 16 ounces, also with a standard deviation of less than an ounce. Comparing the data sets, the processing device 162 may determine that the size of the shampoo bottle has changed and alert a user. Upon investigating the alert, the user may discover that the shampoo bottles are marked with text indicating that "25% MORE" shampoo is provided for the same price. In response, the user may change a size value in an item database, update an item information webpage or other advertising materials or perform other actions.

As noted above, the processing device 162 may generate sort data indicative of one of the channels 125A-125C in which the object 11 was detected and may also generate attribute data indicative of a value of an attribute of the object 11. These two pieces of information may be compared to determine whether the object was deposited in the correct slot. For example, if an object was detected in a channel corresponding to an opening for large objects, but generated size data indicates that the object was small, negative feedback may be generated indicating that the worker 10 deposited the object into the incorrect opening. Likewise, if the size data indicates that the object was, indeed, large, positive feedback may be generated indicating that the worker 10 deposited the object into the correct opening.

In general, the processing device 162 may generate a performance metric based on the sort data and the attribute data that is indicative of an accuracy, speed or other measure of the worker's placement of objects into the openings 120A-120C. The performance metric may be stored in a data structure in the memory 163 and/or fed back to the worker 10 via a feedback area 130 of the receiving surface 110. The feedback area 130 may include a light 132, a scoreboard 136, a speaker 136 or other output devices. In one embodiment, the processing device 162 receives a user identifier from the worker 10 or other source and associates the performance metric with the worker 10. Additional examples of performance metrics and feedback are described below with respect to FIG. 4.

Figure 2:
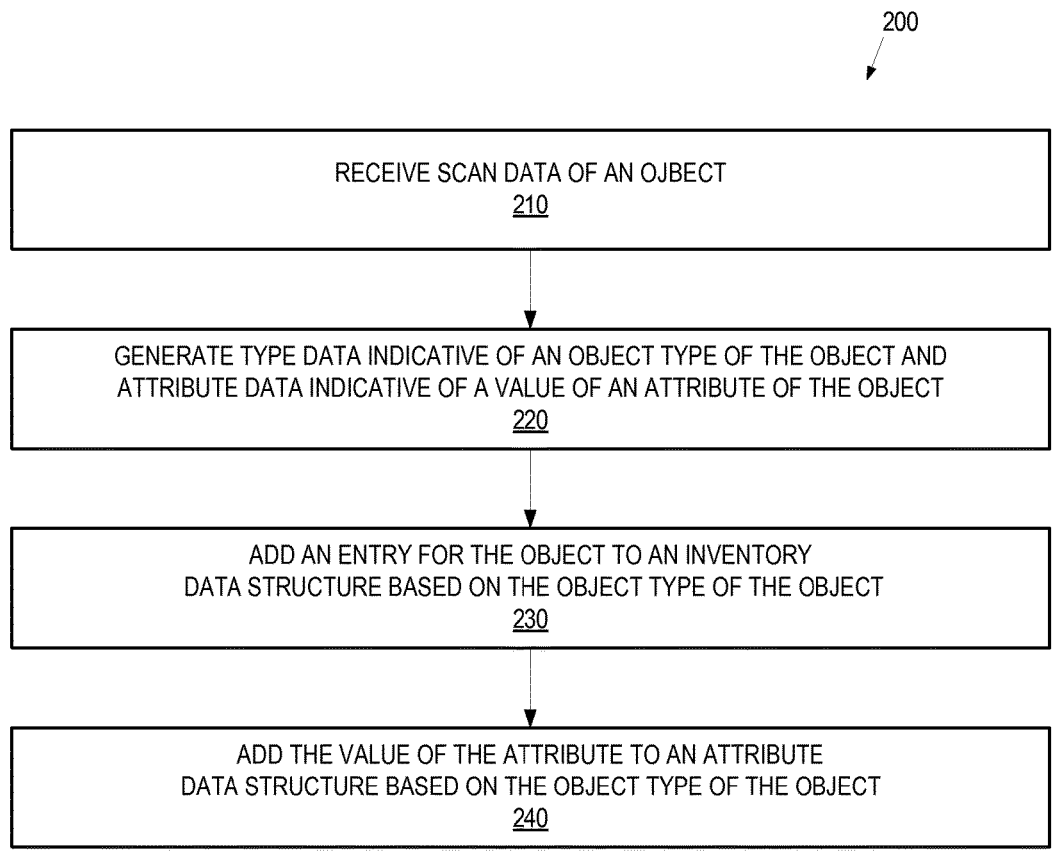
FIG. 2 is a flowchart illustrating an embodiment of a method of receiving objects into inventory.

FIG. 2 is a flowchart illustrating an embodiment of a method of receiving objects into inventory. The method 200 may be performed by processing logic that may include hardware (e.g., circuitry, dedicated logic, programmable logic, microcode, etc.), software (e.g., instructions executed by a processing device), firmware or a combination thereof. For example, the method 200 may be performed by the receiving system 100 of FIG. 1. It is to be appreciated that the method 200 may be performed for any number of objects consecutively or concurrently. However, for ease of reference, the method 200 is described for a single object.

At block 210, the processing logic receives scan data of an object. The scan data may be generated by one or more sensors, scanners or other data generating devices. The scan data may include a reading from a barcode scanner. The scan data may include information read from an RFID chip or via an NFC device. The scan data may include one or more images from one or more image capture devices. In particular, the scan data may include images of each side of an object. The scan data may include other types of data.

At block 220, the processing logic processes the scan data to generate type data indicative of a type of the object and attribute data indicative of a value of an attribute of the object. The processing logic may generate the type data by reading an image of a barcode. The processing logic may generate the type data by analyzing scan data of a reading of an RFID chip encoded with an identifier of the object type.

The attribute of the object may be any attribute derivable from the scan data. As noted above, the attribute may be a size of the object. The processing logic may determine a size of the object by analyzing images of the object. In particular, the processing logic may use object detection and classification techniques to determine an area of an image that corresponds to the object. The size of the object may be determined by analysis of the size of the area of the image that corresponds to the object. The processing logic may use multiple images to generate a three-dimensional (3D) model of the object and determine a size (such as a height, width, length, thickness or volume) of the object based on the 3D model.

The attribute may be a predominant color of the object. As above, the processing logic may use object detection and classification techniques to determine an area of an image that corresponds to the object. The pixels of the area of the image corresponding to the object may be analyzed to determine an average color. As used herein, "average" is used to refer generally to a mean, a median, a mode or other statistical average. The average color may be determined, for example, as an RGB value.

The processing logic may use multiple images to determine an area of an image that corresponds to a particular portion of an object. For example, the processing logic may determine that an object is a book and that a barcode is detected and readable from a first image received from a first image capture device and deduce that the image from a second image capture device disposed in the channel opposite to the first image capture device may be of the cover of the object. The image of the cover may be an attribute. Metrics derived from the image of the cover (such as an average color or dominant text) may also be the attribute.

The attribute may be text of the object. The processing logic may use optical character recognition to determine text on the object. As discussed above, the value of the attribute may be a string indicative of the text itself (e.g., "new look, same great taste"), a flag indicative of the presence or absence of certain text (e.g., "kosher") or any other value. The attribute may be, for example, an expiration date read from the packaging.

At block 230, the processing logic adds an entry for the object to an inventory data structure based on the type of the object. As described above with respect to FIG. 1, an entry for the object may be added by creating a new record for the object in the inventory data structure indicating that an object of the object type has been received or by modifying an existing record associated with the object type so as to indicate that an additional object of the object type has been added to inventory.

At block 240, the processing logic adds an entry for the value of the attribute of the object to an attribute data structure based on the object type of the object. As described above with respect to FIG. 1, an entry for the value of the attribute may be added to a record associated with the object type of the object. Particular methods of using the data stored in the attribute data structure are described below with respect to FIG. 3.

Figure 3:
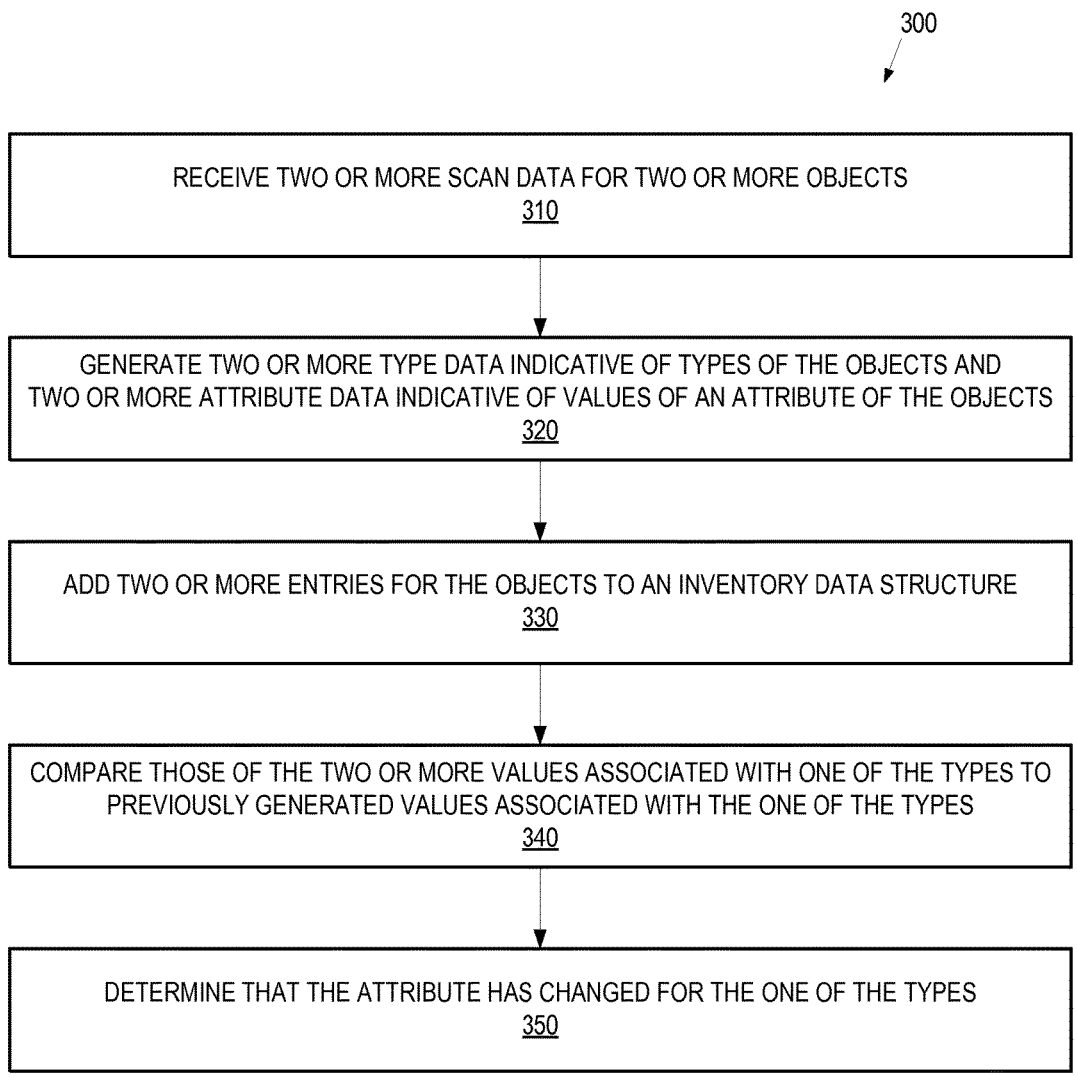
FIG. 3 is a flowchart illustrating an embodiment of a method of determining that an attribute of a type of object has changed.

FIG. 3 is a flowchart illustrating an embodiment of a method of determining whether an attribute of a type of object has changed. The method 300 may be performed by processing logic that may include hardware (e.g., circuitry, dedicated logic, programmable logic, microcode, etc.), software (e.g., instructions executed by a processing device), firmware or a combination thereof. For example, the method 300 may be performed by the receiving system 100 of FIG. 1.

At block 310, the processing logic receives two or more scan data for two or more objects. The scan data for each of the objects may be received as described above with respect to block 210 of FIG. 2. At block 320, the processing logic generates two or more type data indicative of object types of the objects and two or more attribute data indicative of values of an attribute of the objects. The type data and attribute data may be generated as described above with respect to block 220 of FIG. 2. At block 330, the processing logic adds two or more entries for the objects to an inventory data structure. The objects may be added to inventory as described above with respect to block 230 of FIG. 2.

At block 340, the processing logic compares those of the two or more values associated with one of the object types to previously generated values associated with the one of the object types. The previously generated values associated with the one of the object types may be retrieved from a record of an attribute data structure associated with the one of the object types.

At block 350, the processing logic determines whether the attribute has changed for the one of the object types based on the comparison. As mentioned above, the attribute of the object may be any attribute derivable from the scan data. In one embodiment, the attribute is a size of the object. The processing logic may determine that a size of the object has changed when an average of the two or more values is at a threshold percentage greater or at least a threshold percentage less than the average of the previously generated values.

In one embodiment, the attribute may be a 3D model of the object. The processing logic may determine that the shape of the object has changed when a 3D model generated by the new scan data is different from a 3D model generated from previous scan data. The models may be determined as different in a number of ways. For example, the models may be determined as different when the maximum spatial overlap is below a threshold. As another example, each 3D model may be defined by functionally defined curves. The models may be determined as different if the distance between these curves exceeds a threshold.

In another embodiment, the attribute may be a color of the object. The processing logic may determine that a color of the object has changed when an average color derived from the new scan data is different from the average color derived from the previous scan data. The color may be determined as different if a difference in hue value exceeds a threshold. The color may be determined as different if a distance between RGB values exceeds a threshold.

If it is determined (in block 350) that the attribute has changed for the one of the object types, an alert may be generated and delivered to a user. In response to the alert, a user may perform actions as described above with respect to FIG. 1. In one embodiment, actions may be taken automatically by the processing logic, by the receiving computer 160 of FIG. 1 or by another processing system.

In one embodiment, the value of the attribute data for each object is separately compared to the previously stored values of the attribute data for objects of the same object type. If the value of the attribute data is significantly different, this may indicate that the item is damaged and an alert may be generated and appropriate actions taken in response.

Figure 4:
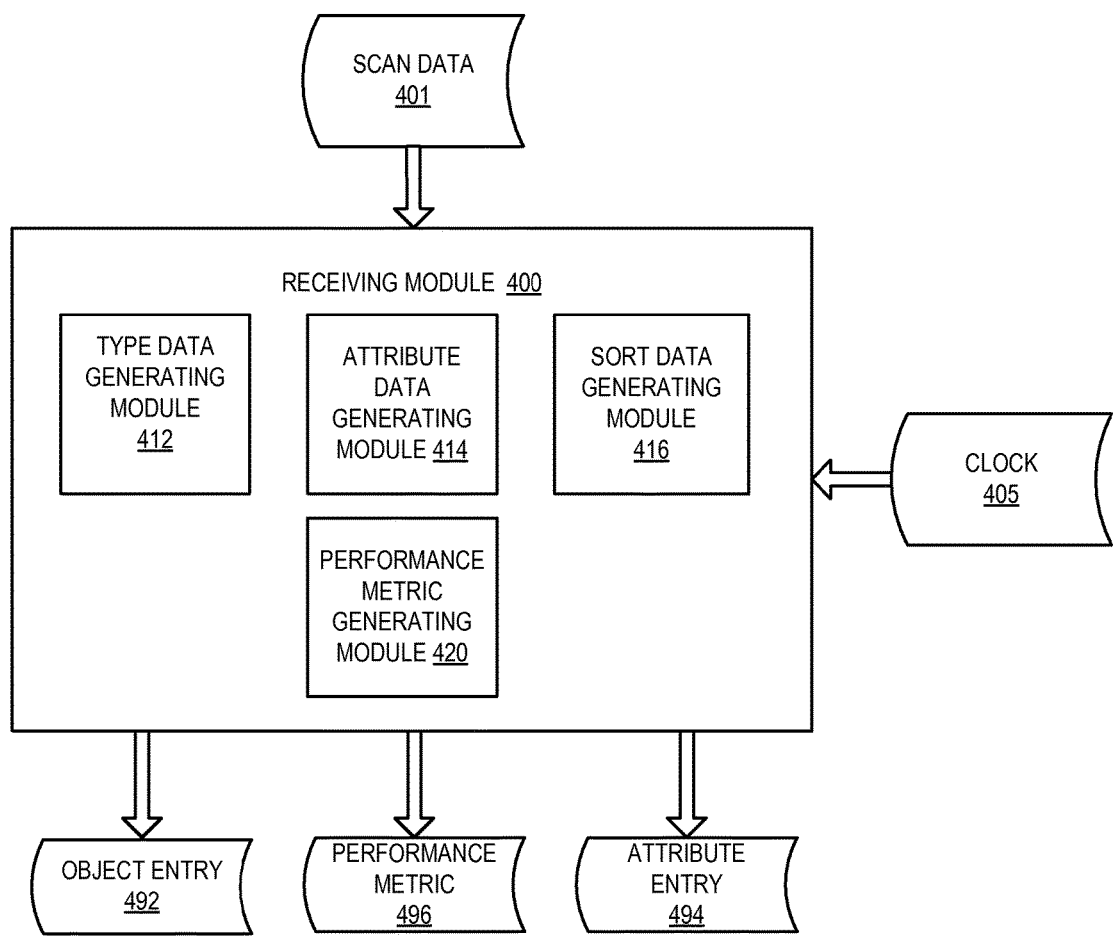
FIG. 4 illustrates an embodiment of a receiving module.

FIG. 4 illustrates an embodiment of a receiving module 400. The receiving module 400 may be executed by the processing device 162 of the receiving system 100 of FIG. 1. The receiving module takes, as input, scan data 401 generated by one or more sensors, scanners or other data generating devices. The receiving module 400 may also use information from an internal or external clock 405 as part of its processing.

The receiving module 400 processes the input data to generate an object entry 492 which may be provided to an inventory data structure, an attribute entry 494 which may be provided to an attribute data structure and a performance metric 496 that can be stored or used to provide feedback to a worker.

The receiving module 400 includes a type data generating module 412 that processes the received scan data 401 to generate type data indicative of an object type of an object. The type data may be used by the receiving module 400 to generate the object entry 492. The type data may be generated by reading an image of or otherwise scanning a barcode. The type data may be generated by reading of an RFID chip encoded with an identifier of the object type.

The receiving module 400 includes an attribute data generating module 414 that processes the received scan data 401 to generate attribute data indicative of a value of an attribute of an object. The attribute data may be used by the receiving module 400 to generate the attribute entry. The type data may be used by the receiving module 400 to insert the attribute entry into the appropriate record of an attribute data structure.

The attribute of the object may be any attribute derivable from the scan data. As noted above, the attribute may be a size of the object. The attribute data generating module 414 may determine a size of the object by analyzing images of the object. In particular, the attribute data generating module 414 may use object detection and classification techniques to determine an area of an image that corresponds to the object. The size of the object may be determined by analysis of the size of the area of the image that corresponds to the object. The attribute data generating module 414 may use multiple images to generate a three-dimensional (3D) model of the object and determine a size (such as a height, width, length, thickness or volume) of the object based on the 3D model.

The attribute may be a predominant color of the object. As above, the attribute data generating module 414 may use object detection and classification techniques to determine an area of an image that corresponds to the object. The pixels of the area of the image corresponding to the object may be analyzed to determine an average color. As used herein, "average" is used to refer generally to a mean, a median, a mode or other statistical average. The average color may be determined, for example, as an RGB value.

The attribute data generating module 414 may use multiple images to determine an area of an image that corresponds to a particular portion of an object. For example, the attribute data generating module 414 may determine that an object is a book and that a barcode is detected and readable from a first image received from a first image capture device and deduce that the image from a second image capture device disposed in the channel opposite to the first image capture device may be of the cover of the object. The image of the cover may be an attribute. Metrics derived from the image of the cover (such as an average color or dominant text) may also be the attribute.

The attribute may be text of the object. The attribute data generating module 414 may use optical character recognition to determine text on the object. As discussed above, the value of the attribute may be a string indicative of the text itself (e.g., "new look, same great taste"), a flag indicative of the presence or absence of certain text (e.g., "kosher") or any other value. The attribute may be, for example, an expiration date read from the packaging.

The receiving module 400 includes a sort data generating module that processes the received scan data 401 to generate sort data indicative of which of a number of channels an object was detected in. Thus, the sort data indicates the opening into which a worker inserted an object.

The receiving module 400 may process the scan data for multiple objects to generate type data, attribute data and sort data for multiple objects. The sort data and attribute data (and the clock data) may be used by a performance metric generating module 420 to generate one or more performance metrics.

In one embodiment, the performance metric is based on an accuracy metric indicative of a percentage of the sort data that matches the corresponding attribute data. Thus, the accuracy metric indicates the percentage of objects determined to have an attribute that were deposited by the worker into the opening associated with that attribute. Other accuracy metrics may be generated. For example, a receiving structure may have a small opening for small objects, a medium opening for medium objects and a large opening for large objects. For each object deposited, an accuracy value may be generated equal to a first value (e.g., ten) if the object is determined to be of the same size as the opening, a second value (e.g., five) if the object is determined to be close to the same size as the opening (e.g., a small object placed in the medium opening or a medium object placed in the large opening) and a third value (e.g., zero) otherwise (e.g., a small object placed in the large opening). The accuracy metric may include or be based on the average accuracy value.

In one embodiment, the performance metric is based on a speed metric indicative of a rate (derived from the clock data) at which the sort data is generated. Thus, the speed metric indicates the rate at which the worker deposits objects into the openings.

The performance metric may be based on multiple metrics in various ways, such as an accuracy metric that is weighted by a speed metric or the sum of two or more metrics. Alternatively, the performance metric may be as simple as a flag indicative whether or not an object was deposited into the correct opening.

An indication of the performance metric may be output to the worker or to another user. The output may be an audiovisual output such as a light, a sound or a display. For example, in one embodiment, when a worker deposits an object into the incorrect opening, an error sound is generated and a colored light proximal to the correct opening is lit up. In one embodiment, the performance metric is displayed as a score on a feedback area of the receiving surface.

Figure 5:
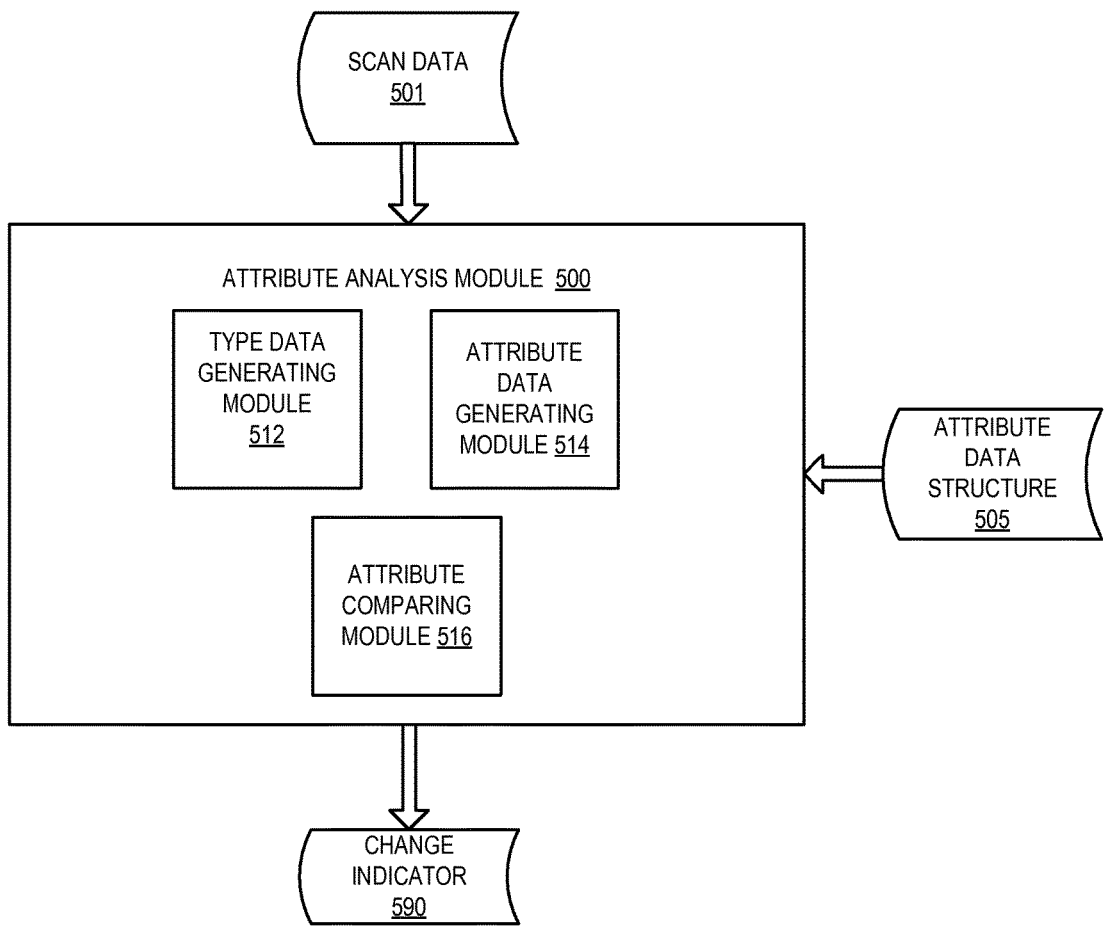
FIG. 5 illustrates an embodiment of an attribute analysis module.

FIG. 5 illustrates an embodiment of an attribute analysis module 500. The attribute analysis module 500 may be executed by the processing device 162 of the receiving system 100 of FIG. 1. The attribute analysis module 500 takes, as input, scan data 501 generated by one or more sensors, scanners or other data generating devices. The attribute analysis module 500 may also use information stored in an attribute data structure 505.

The attribute analysis module 500 processes the input data to generate a change indicator 590 that indicates that at least one attribute has changed for at least one of a number of object types. The change indicator 590 may be provided to a user as an alert or report.

The attribute analysis module 500 includes a type data generating module 512 that processes the received scan data 501 to generate type data indicative of an object type of an object. The attribute analysis module 500 includes an attribute data generating module 514 that processes the received scan data 501 to generate attribute data indicative of a value of an attribute of an object. The attribute data generating module 514 may include similar functionality to the attribute data generating module 414 of FIG. 4.

The attribute analysis module 500 includes an attribute comparing module 516 that, for one or more of a number of different object types, compares values of one or more attribute at different times to determine whether a change in the value of the attribute has occurred. The attribute comparing module 516 may compare values and determine that a change has occurred as described above with respect to block 340 and 350 of FIG. 3.

Figure 6:
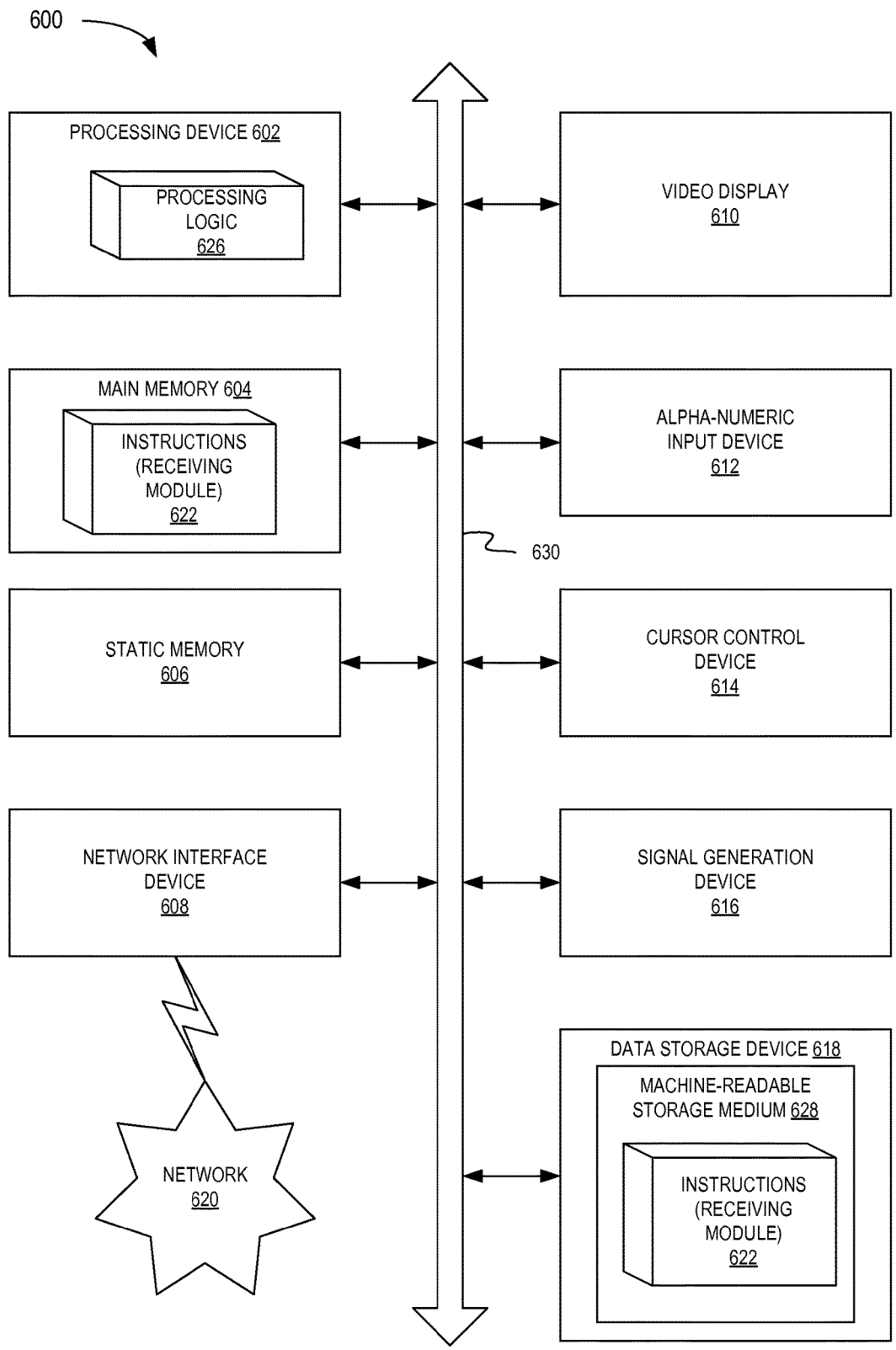
FIG. 6 illustrates a functional block diagram of an exemplary electronic device, in accordance with one embodiment.

FIG. 6 illustrates a diagrammatic representation of a machine in the exemplary form of a computer system 600 within which a set of instructions, for causing the machine to perform any one or more of the methodologies discussed herein, may be executed. The computer system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server machine in client-server network environment. The machine may be a personal computer (PC), a set-top box (STB), a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the computer system 600 may represent the receiving system 100 of FIG. 1.

The computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 618, which communicate with each other via a bus 630.

The processing device 602 represents one or more general-purpose processing devices such as a microprocessor, central processing unit or the like. More particularly, the processing device 602 may be a complex instruction set computing (CISC) microprocessor, reduced instruction set computing (RISC) microprocessor, very long instruction word (VLIW) microprocessor or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 616 (e.g., a speaker).

The data storage device 618 may include a computer-readable medium 628 on which is stored one or more sets of instructions 622 (e.g., instructions of the receiving module 400 and/or attribute analysis module 500) embodying any one or more of the methodologies or functions described herein. The instructions 622 may also reside, completely or at least partially, within the main memory 604 and/or within processing logic 626 of the processing device 602 during execution thereof by the computer system 600, the main memory 604 and the processing device 602 also constituting computer-readable media. The instructions 622 may further be transmitted or received over a network 620 via the network interface device 608.

While the computer-readable storage medium 628 is shown in an exemplary embodiment to be a single medium, the term "computer-readable storage medium" or "computer-readable medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

The preceding description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions.

The algorithms and displays presented herein are not inherently related to any particular computer or other apparatus. Various general purpose systems may be used with programs in accordance with the teachings herein or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
a wall element having a plurality of openings of different sizes to receive one or more objects to be sorted in a plurality of containers;
a plurality of chutes, each chute coupling one of the plurality of openings with one of the plurality of containers;
at least one camera positioned in a first chute of the plurality of chutes, the at least one camera to generate scan data for a first object deposited into a first opening corresponding to the first chute; and
a processing device to:
 receive, from the at least one camera, first scan data corresponding to a plurality of objects comprising the first object;
 apply object detection processing to the first scan data to identify and classify the plurality of objects;
 generate, based on the object detection processing of the first scan data, (1) type data indicative of an object type of one of the plurality of objects, (2) sort data indicative of the one of the plurality of chutes in which one of the plurality of objects was detected and (3) attribute data indicative of a shape of an object and packaging data corresponding to one of the plurality of objects;
 add the plurality of objects to an inventory based on the type data;
 determine a performance metric based on a comparison of first attribute data of the first object of the plurality of objects and first sort data indicating the first chute comprising the at least one camera that detected a presence of the first object, wherein the performance metric comprises a score indicating a size of the first chute corresponds to the first attribute data of the first object; and
 provide an output indicative of the performance metric.

2. The system of claim 1, wherein the output is an audiovisual output comprising at least one of a colored light, an error sound or a displayed score.

3. A method comprising:
receiving, from a camera positioned in a first chute coupled to an opening of a wall element, scan data associated with an object deposited into the opening corresponding to the first chute;

applying object detection processing to the scan data to identify and classify the object;

generating, based on the object detection processing of the scan data, type data indicative of an object type of the object, sort data indicative of the first chute in which the object was detected, and attribute data indicative of a shape of the object and packaging data corresponding to the object;

adding an entry for the object to an inventory data structure based on the type data; and storing the attribute data corresponding to the object in an attribute data structure based on the type data, wherein the attribute data structure associates at least a first object type with a first plurality of values of the attribute data and a second object type with a second plurality of values of the attribute data.

4. The method of claim 3, wherein the scan data comprises a plurality of images of the object.

5. The method of claim 4, wherein the camera is one of a plurality of cameras oriented to surround the object and generate the plurality of images.

6. The method of claim 3, wherein the attribute data of the object comprises at least one of a size of the object or a color of the object.

7. The method of claim 3, wherein the attribute data of the object comprises a packaging parameter of the object.

8. The method of claim 3, further comprising:

receiving sort data indicative of one of a plurality of chutes in which imaging-of the object occurred;

determining a first value of the attribute based on the one of the plurality of chutes;

determining a second value of the attribute based on the attribute data; and determining an accuracy metric based on the first value and the second value.

9. The method of claim 3, wherein:

receiving the scan data comprises receiving a plurality of scan data of a plurality of objects;

generating the type data and the attribute data comprises generating, based on the object detection processing of the plurality of scan data, a plurality of type data indicative of a plurality of object types of the plurality of objects and a plurality of attribute data indicative of a plurality of values of one or more attributes of the plurality of objects;

adding the entry for the object comprises adding a plurality of entries for the plurality of objects to the inventory data structure based on the plurality of type data; and storing the value comprises storing the plurality of values of the attribute of the plurality of objects in the attribute data structure based on the plurality of type data.

10. The method of claim 9, further comprising:

receiving a plurality of sort data indicative of respective ones of a plurality of chutes in which the scan data was generated;

determining a performance metric based on the plurality of sort data and the plurality of attribute data; and providing an indication of the performance metric.

11. The method of claim 10, wherein the performance metric comprises an accuracy metric indicative of a percentage of the plurality of sort data that match the plurality of attribute data.

12. The method of claim 10, wherein the performance metric comprises a speed metric indicative of a rate at which the plurality of sort data was generated.

13. The method of claim 10, wherein providing an indication of the performance metric comprises generating an audiovisual output.

14. A non-transitory computer-readable medium having instructions encoded thereon which, when executed by a processing device, cause the processing device to perform operations comprising:

receiving, from a camera positioned in a first chute coupled to an opening of a wall element, a plurality of scan data identifying a plurality of objects comprising a first object;

applying object detection processing to the scan data to identify and classify the plurality of objects;

generating, based on the object detection processing of the plurality of scan data, type data indicative of a plurality of object types of the plurality of objects and a plurality of attribute data indicative of a size and a shape of an object and packing data corresponding to plurality of values of an attribute of the plurality of objects;

adding a plurality of entries for the plurality of objects to an inventory data structure based on the type data;

comparing, by the processing device, the plurality of values associated with one of the plurality of object types with a previously generated plurality of values associated the one of the plurality of object types stored in an attribute data structure; and determining, by the processing device, that the attribute has changed for the one of the plurality of object types based on the comparison.

15. The non-transitory computer-readable medium of claim 14, wherein determining that the attribute has changed comprises determining that a packaging associated with the one of the plurality of object types has changed.

16. The non-transitory computer-readable medium of claim 14, wherein determining that the attribute has changed comprises determining that a size or shape of objects associated with the one of the plurality of object types has changed.

17. The non-transitory computer-readable medium of claim 14, the operations further comprising generating, before receiving the plurality of scan data, the previously generated plurality of values by:

receiving a previous plurality of scan data of a previous plurality of objects;

generating, based on the previous plurality of scan data, a previous plurality of type data indicative of a previous plurality of object types of the previous plurality of objects and a previous plurality of attribute data indicative of a previous plurality of values of the attribute of the previous plurality of objects;

adding a plurality of previous entries for the previous plurality of objects to the inventory data structure based on the previous plurality of type data; and storing the previous plurality of values of the attribute of the previous plurality of objects in the attribute data structure based on the previous plurality of type data.

* * * * *